Jan. 14, 1930.  M. H. TONCRAY ET AL  1,743,503
COWL VENTILATOR
Filed May 28, 1929
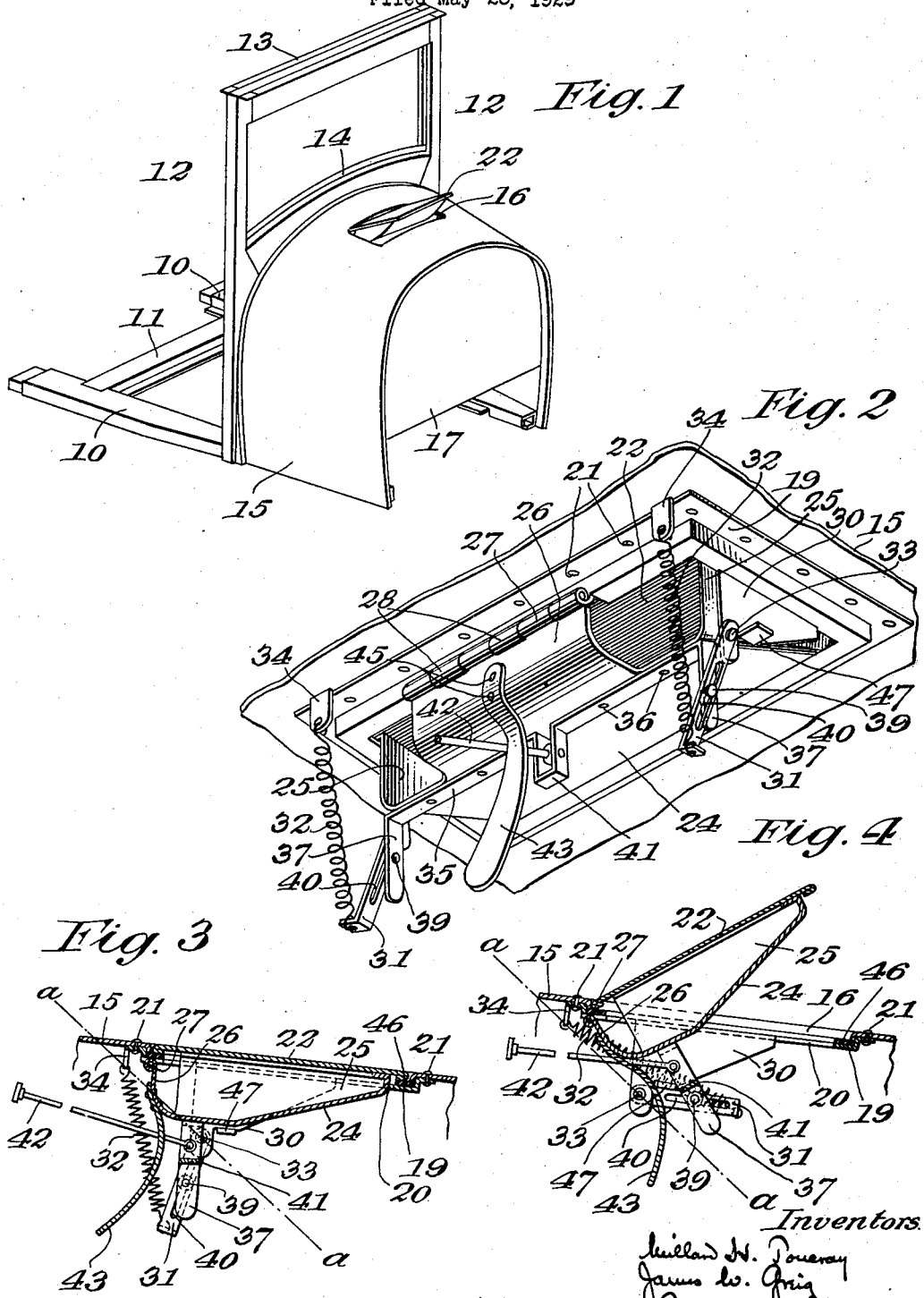
Inventors.
Attorneys.

Patented Jan. 14, 1930

1,743,503

UNITED STATES PATENT OFFICE

MILLARD H. TONCRAY, OF DETROIT, AND JAMES W. GREIG, OF GROSSE POINTE PARK, MICHIGAN, ASSIGNORS TO HUDSON MOTOR CAR COMPANY, OF DETROIT, MICHIGAN, A CORPORATION OF MICHIGAN

COWL VENTILATOR

Application filed May 28, 1929. Serial No. 366,722.

This invention relates to cowl ventilators for automobiles and has for its general object the provision of a cowl ventilator operating mechanism which may be readily and conveniently operated to open or close the ventilator and which will act automaticaly to hold the parts firmly in either the open or the closed position.

The more particular objects of the invention, together with means whereby the latter may be carried into effect, will be more clearly understood from the following description of a preferred embodiment thereof illustrated in the accompanying drawings; in which, Fig. 1 is a perspective view of a portion of an automobile body embodying the cowl ventilator of the invention;

Fig. 2 is a perspective view of the ventilator as seen from the interior of the body; and Figs. 3 and 4 are sectional detail views taken through the ventilator when it is closed and opened respectively.

Before explaining in detail the present invention, and the method or mode of operation embodied therein, it is to be understood that the invention is not limited in its application to the details of construction and arrangements of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

As illustrated in the drawings, the cowl ventilator is embodied in an automobile body comprising sill members 10 reenforced by cross members 11. Suitable front pillars 12 are mounted upon the sill members and are connected at their upper ends by a header 13 and below their upper ends by a belt panel 14, the windshield opening being defined by the pillars 12 and the header and belt panel. A cowl 15 is provided with an opening 16 and is secured at its rear edge to the pillars 12 and belt panel 14, the forward edge of the cowl being secured to the edge of a dash 17.

The cowl opening 16 is surrounded by a suitable frame 19 of Z-shaped cross section which is secured to the interior surface of the cowl in any suitable manner as by rivets 21 so as to bring its opening 20 directly below the cowl opening 16. The cowl opening 16 is closed by a suitable ventilator or closure having a cover or top portion 22 conforming to the form of the cowl. A pan-shaped frame 24 is secured at its forward edge in any suitable manner to the under surface of the cover 22 and is provided with side projections 25 which are also suitably secured to the under surface of the cover 22. The frame 24 is provided at its rear end with a projection 26 extending rearwardly and upwardly, the end of which is shaped to form a hinge member 27 cooperating with a hinge member 28 depending from the frame 19.

The frame 19 is provided at opposite sides with depending lugs 30 to the lower end of each of which one end of a link 31 is pivoted at 33. Separate springs 32 connect the free ends of the links 31 with lugs 34 depending from the frame 19. A bar 35 is secured to the lower surface of the frame 24 in any suitable manner, as by rivets 36, and is provided at its ends with depending arms 37 to each of which a stud or bolt 39 is secured, each of which is adapted to project into a slot 40 in one of the links 31. The bar 35 is formed near its center with a depending yoke 41 within which one end of a hand operating rod 42 is pivotally secured, the other end of the rod 42 extending through a suitable opening or sleeve (not shown) in the instrument board so that it may be easily accessible to the driver. If desired, a foot lever 43 may be secured to the ventilator. As illustrated the lever 43 is secured by rivets 45 to the projection 26 so as to extend downwardly a considerably distance from the ventilator.

The ventilator may be operated by the driver to open by pushing or to close by pulling upon the rod 42 or similarly by moving the lever 43 with the foot. In either case when the ventilator has been moved, the spring 32 acts upon the link 31 to complete the movement and hold the ventilator open or closed, the arrangement being such that when the rod 42 or lever 43 is moved to bring the link 31 beyond a dead center (as shown by the line a—a in Figs. 3 and 4) the spring 32 acts to complete the movement and maintain the ventilator in either an open or closed position depending upon the direction of movement of the rod 42 or lever 43. The closed position of the ventilator, shown in Figs. 2 and 3, is determined by engagement of the marginal edge of the cover 22 with the lower flange of the frame 19 or preferably, with a suitable packing strip 46 carried thereby, the springs 32 at this time acting to press said edge firmly against said flange or packing strip so as to prevent rattling and exclude air, dust and rain. The lugs 30 are formed at their lower ends with outwardly turned ears 47 constituting stops which, when the ventilator is opened, are engaged by the links 31 to limit the opening movement and determine the fully opened position, shown in Figs. 1 and 4, the springs 32 at this time acting to hold said links closely against said stops and again preventing rattling.

The present application is a continuation, in part and with respect to all common subject matter, of a prior application filed May 11, 1928, Serial No. 276,921.

What we claim is:

1. In combination with an automobile cowl having an opening, a pivoted closure for said opening, means for moving said closure to closed or open position, an arm depending from said closure, a link pivoted at one end to a fixed portion of the cowl, and slidably connected at an intermediate point to said arm, and a spring connecting the other end of said link with a fixed portion of the cowl.

2. In combination with an automobile cowl having an opening, a pivoted closure for said opening, means for moving said closure to closed or open position, an arm depending from said closure, a link pivoted at one end to a fixed portion of the cowl and slidably connected at an intermediate point to said arm, a spring connecting the other end of said link with a fixed portion of the cowl, and a stop limiting the open position of said closure.

3. In combination with an automobile cowl having an opening, a pivoted closure for said opening, means for moving said closure to closed or open position, an arm depending from said closure, a link pivoted at one end to a fixed portion of the cowl, a stud and slot connection between said arm and link, and a spring connecting the other end of said link with a fixed portion of a cowl.

4. In combination with an automobile cowl having an opening, a frame secured to the interior surface of the cowl and surrounding said opening, a closure for said opening pivoted to said frame, spaced lugs depending from the rear portion of said frame, a lug depending from each side of said frame, a link pivoted at one end to each of said side lugs, spaced arms depending from said closure each slidably connected to an intermediate portion of one of said links, and springs separately connected at one end to the free ends of said links and at their other ends to said rear lugs.

In testimony whereof we affix our signatures.

MILLARD H. TONCRAY.
JAMES W. GREIG.